Patented Feb. 18, 1941

2,231,989

UNITED STATES PATENT OFFICE 2,231,989

POROUS CLAY WARE

Henry Seymour Colton, Shaker Heights, Ohio, assignor to H. Seymour Colton, M. J. Rentschler, and James A. Weeks, as trustees No Drawing. Application June 15, 1938,
Serial No. 213,878

3 Claims. (Cl. 106—9)

This invention relates to improvements in porous clay ware, and has to do with the method of producing the ware as well as with the ware itself.

It has been proposed heretofore to render clay ware porous, in order to increase its effectiveness as a heat insulator, and to decrease its weight, by mixing with it combustible material such as sawdust, finely comminuted cork, coal, etc., so that when the formed objects are fired the combustible material will be burned off, leaving air spaces in the ware. A similar result has been obtained by mixing with the clay a solid material, such as diatomaceous earth, coke, or the like, possessing air spaces in itself. Both of these methods result in the production of relatively large air spaces.

In accordance with my invention on the other hand, the air spaces formed are of microscopic size and result from the driving off of the moisture contained in a colloidal or partially colloidal plastic material which I mix with the clay. In the mix therefore there are present high percentages of water stiffened with a colloid whereby the clay particles are separated from each other, and this water upon evaporating leaves a skeleton of clay and hardened plastic containing a vast number of air spaces of minute size. Because of the smaller size and better distribution of air spaces in the product of the present invention it has better insulating qualities than porous clay ware produced by the previous methods, and it is very light in weight as compared with objects made from clay alone. Furthermore, there is less tendency for it to spall in firing, and in fact if the proportion of clay is not greater than 25% of the whole mix, it may be fired without spalling immediately after it is formed into the desired articles, that is without any previous drying.

One of the objects of the invention therefore is the provision of porous clay ware possessing high insulating qualities.

Another object is the provision of a method of manufacturing porous clay ware in which the tedious and expensive step of drying preparatory to firing may be eliminated or greatly shortened.

Other objects and features of novelty will appear as I proceed with the description of certain particular embodiments of my novel clay ware and the method of producing the same.

In carrying out the invention I prefer to employ, as the colloidal plastic material above mentioned, a certain mixture of coprecipitated and coalesced calcium sulphate and iron hydroxide produced from sulphuric acid iron pickle liquor, as described in my copending application Serial No. 196,491, filed March 17, 1938, now Patent No. 2,165,344. This material is composed substantially of calcium sulphate and ferrous hydroxide in the proportions approximately of 60% calcium sulphate and 40% ferrous hydroxide. This special material, while probably not a true colloid in all of its properties, has certain colloidal characteristics which render it very effective for use in my present invention. For example it is of very fine particle size and also absorbs a high percentage of water. I utilize in the present invention a wet press cake of this material which contains approximately 50% moisture. However, other colloidal materials which are suitable for firing without fusion and which remain in a relatively solid state when mixed with high percentages of water, that is 40% to 80%, may be utilized. Bentonite is one example of such material.

To obtain one specific product in accordance with the invention, I add one part of pulverized dry clay to two parts of wet colloidal plastic (preferably the press cake above mentioned) and mix the two intimately in a pug mill or other suitable apparatus. Water may be added if necessary to bring the mix to the desired consistency for molding. The mass is then stiff and can be easily shaped into brick, tile, hot tops, or similar objects. After molding or otherwise forming the objects I dry them at atmospheric or higher temperatures, preferably not exceeding 100° C. at the start. In the course of the drying operation the ferrous hydroxide oxidizes to ferric hydroxide, as is evidenced by a change in the color of the material. Thereafter I fire the objects at a suitable temperature for burning the type of clay in the mix, being careful, however, not to reach a high enough temperature to entirely flux the mass, which would thereby eliminate the air spaces. 1000° C. or 1800° F. is a temperature which I have found to give satisfactory results.

This particular mixture is one which gives good insulating value, and the resulting object is relatively strong and permanent although not quite so strong as a fired straight clay object of the same dimensions would be. It has, however, only about half the weight of the straight clay object and includes a multiude of fine air spaces. One important advantage is that these objects may be dried rapidly and fired much more rapidly than straight clay ware, owing to the fact that the porous nature of the material tends to eliminate spalling. This characteristic is so marked, in fact, that if the quantity of clay be decreased to as little as 25%, all preparatory drying may be dispensed with and the firing may be undertaken immediately upon the molding or other forming of the objects.

For many purposes however I prefer to utilize somewhat larger proportions of clay for the reason that it lends strength to the finished article. It is desirable in such cases to have at least one-third by weight of the finished dry material of clay composition. In every case the volume of hardened plastic will be greater than that of the clay composition.

In the case of Bentonite or other colloidal or partially colloidal material suitable for the purpose which may be obtained dry, such material may be mixed with the clay before water is added. This mix will of course require a large amount of water to make it moldable. In every case the driving off of the water leaves a porous skeleton which accomplishes my purpose.

Having thus described my invention, I claim:

1. The method of making porous clay ware which comprises forming a joint precipitate of calcium sulphate and ferrous hydroxide in the proportions approximately of 60% and 40% respectively, mixing said precipitate with clay, the mixture containing a large percentage of water while remaining moldable, the proportions by weight of the clay and colloidal material being approximately 1-to-2, forming a plastic mixture of these constituents into articles of desired shape, and firing the articles, whereby the resulting ware contains pores of microscopic size and has a relatively low specific gravity.

2. The method of making porous clay ware without preliminary drying which comprises forming a joint precipitate of calcium sulphate and ferrous hydroxide in the proportions approximately of 60% and 40% respectively, mixing said precipitate with clay, the mixture containing a large percentage of water while remaining moldable, the proportion by weight of clay being approximately 25%, forming a plastic mixture of these constituents into articles of desired shape, and firing the articles.

3. A fired porous clay article, wherein the clay particles are disseminated throughout a hardened plastic containing microscopic pores, the proportion by volume of hardened plastic being at least as great as that of clay, said plastic comprising a joint precipitate of calcium sulphate and iron hydroxide in proportions approximately of 60% calcium sulphate and 40% iron hydroxide.

HENRY SEYMOUR COLTON.